(No Model.)
E. J. BRADY.
PAN FOR WATER CLOSETS.
No. 310,370. Patented Jan. 6, 1885.
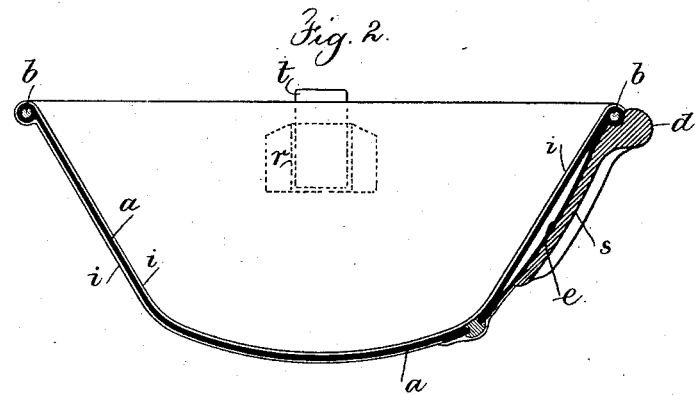
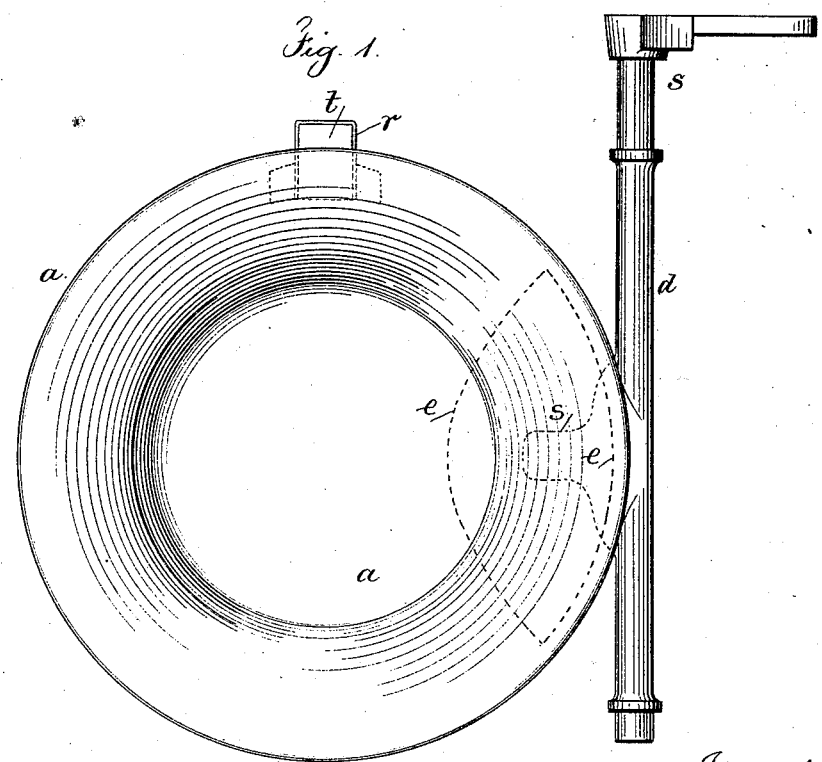
Witnesses
Chas. H. Smith
J. Staib
Inventor
Edward J. Brady
per Lemuel W. Serrell
Atty

UNITED STATES PATENT OFFICE.

EDWARD J. BRADY, OF BROOKLYN, NEW YORK.

PAN FOR WATER-CLOSETS.

SPECIFICATION forming part of Letters Patent No. 310,370, dated January 6, 1885.

Application filed May 31, 1884. (No model.)

*To all whom it may concern:*

Be it known that I, EDWARD JOSEPH BRADY, of Brooklyn, in the county of Kings and State of New York, have invented an Improvement in Pans for Water-Closets, of which the following is a specification.

Pans for water-closets have usually been made of copper with a wire around the edge of the metal, which is rolled over to surround such wire. This pan has been tinned; but it is difficult to keep the same clean, and on the under side especially the copper becomes coated with verdigris and offensive matter. Besides this, the pan is liable to break at the place where the axle is attached to it.

This invention is made to strengthen the pan, and for allowing the same to be glazed with a vitrified enamel, and to prevent such enamel being injured by the heat in soldering the axle to the pan.

In the drawings, Figure 1 is a plan view, and Fig. 2 is a vertical section, of the pan.

The pan $a$ is made of sheet-copper or other metal, and the edge thereof is rolled over and around the wire $b$, to obtain greater strength. At the side of the pan adjacent to the axle $d$, I apply a re-enforcing plate, $e$, the same being firmly attached at its edges to the pan $a$, preferably by countersunk rivets or by brazing, and the middle portion of this re-enforcing plate is at a slight distance from the pan $a$, so as to form an air-space. In this condition the pan is coated with a vitrified enamel, both inside and outside, as at $i$ $i$, with the exception that the central and upper portions of the re-enforcing plate $e$ are left without enamel. The object of this vitrified enamel is to protect the pan and form a surface that is easily kept clean by the action of the water or by a brush or cloth.

The object in leaving the central portion of the re-enforcing plate free from enamel is to allow the axle $d$ and its extension or lifting arm $s$ to be soldered to the surface of this re-enforcing plate, so as to make a very strong and reliable attachment. By providing an air-space between the middle part of the re-enforcing plate and the pan, there is no risk of the enamel becoming injured by the heat made use of in soldering on the axle. When the pan swings up to its place, the edge usually comes into contact with the under side of the top of the container. This would be likely to clip or crack the enamel.

I provide one or more sockets, $r$, at the edge of the pan, each socket being hollow and adapted to the reception of a block of india-rubber, $t$, the upper end of which projects above the edge of the pan, so as to form an elastic stop that comes against the under side of the top of the container. In cases where a stop of leather or similar material has been used it has been connected with the container, and when injured it cannot be replaced without taking the closet to pieces. The sockets $r$ being upon the pan allows for the rubbers being easily removed or replaced.

I claim as my invention—

1. The water-closet pan, made of sheet metal, with a re-enforcing plate attached at one side, and having an air-space between such pan and the central portion of such re-enforcing plate, substantially as set forth.

2. The water-closet pan, made of sheet metal, with the surface enameled and one or more sockets upon the pan near its edge, in combination with the rubber block inserted into the socket, substantially as set forth.

Signed by me this 26th day of May, A. D. 1884.

EDWARD J. BRADY.

Witnesses:
GEO. T. PINCKNEY,
WILLIAM G. MOTT.